(12) United States Patent
Iwasa

(10) Patent No.: US 9,347,809 B2
(45) Date of Patent: May 24, 2016

(54) ULTRASONIC FLOWMETER HAVING AN ULTRASONIC TRANSDUCER WITH A RING SHAPED VIBRATOR AND A PAIR OF DAMPING MEMBERS

(71) Applicant: Masamichi Iwasa, Zama (JP)

(72) Inventor: Masamichi Iwasa, Zama (JP)

( * ) Notice: Subject to any disclaimer, the term of this patent is extended or adjusted under 35 U.S.C. 154(b) by 75 days.

(21) Appl. No.: 14/355,936

(22) PCT Filed: Oct. 1, 2012

(86) PCT No.: PCT/JP2012/006279
§ 371 (c)(1),
(2) Date: May 2, 2014

(87) PCT Pub. No.: WO2013/065231
PCT Pub. Date: May 10, 2013

(65) Prior Publication Data
US 2014/0311253 A1    Oct. 23, 2014

(30) Foreign Application Priority Data
Nov. 4, 2011  (JP) ................................. 2011-241803

(51) Int. Cl.
G01F 1/66    (2006.01)

(52) U.S. Cl.
CPC *G01F 1/667* (2013.01); *G01F 1/66* (2013.01); *G01F 1/662* (2013.01)

(58) Field of Classification Search
None
See application file for complete search history.

(56) References Cited

U.S. PATENT DOCUMENTS

| | | | | |
|---|---|---|---|---|
| 5,052,230 A * | 10/1991 | Lang | ................ | G01F 1/667 73/861.28 |
| 6,055,868 A * | 5/2000 | Koyano | ................ | G01F 1/667 73/861.28 |
| 6,612,168 B2 * | 9/2003 | Barr | ................ | G01B 17/00 73/290 R |
| 2008/0307888 A1 * | 12/2008 | Yoshioka | ................ | B60Q 1/0023 73/627 |
| 2009/0301205 A1 * | 12/2009 | Reiche | ................ | G10K 9/122 73/632 |

* cited by examiner

*Primary Examiner* — Harshad R Patel
(74) *Attorney, Agent, or Firm* — Wenderoth, Lind & Ponack, L.L.P.

(57) ABSTRACT

An ultrasonic flowmeter uses an ultrasonic sensor comprising a ring-shaped ultrasonic vibrator that is disposed on an outer circumferential surface of a conduit tube in which a minute quantity of a substance flows and that is vibrated by application of high frequency signals and generates high frequency signals by receiving the vibration; and a pair of damping members that is arranged so as to grasp and fix the ultrasonic vibrator, wherein an annular soft uniform matching member having a width along the conduit tube that is larger than a width of the ultrasonic vibrator is provided between an inner circumferential surface of the ultrasonic vibrator and the outer circumferential surface of the conduit tube, and the matching member is made of a material having a sound propagation velocity substantially equal to a sound propagation velocity of the substance flowing in the conduit tube.

20 Claims, 7 Drawing Sheets

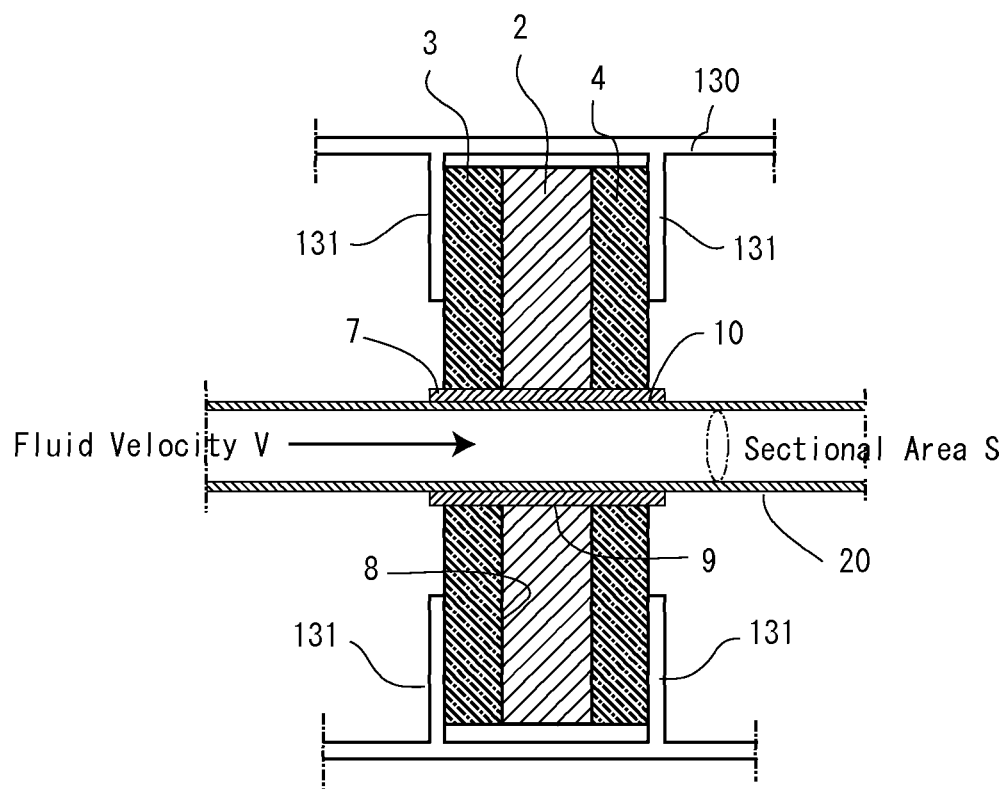

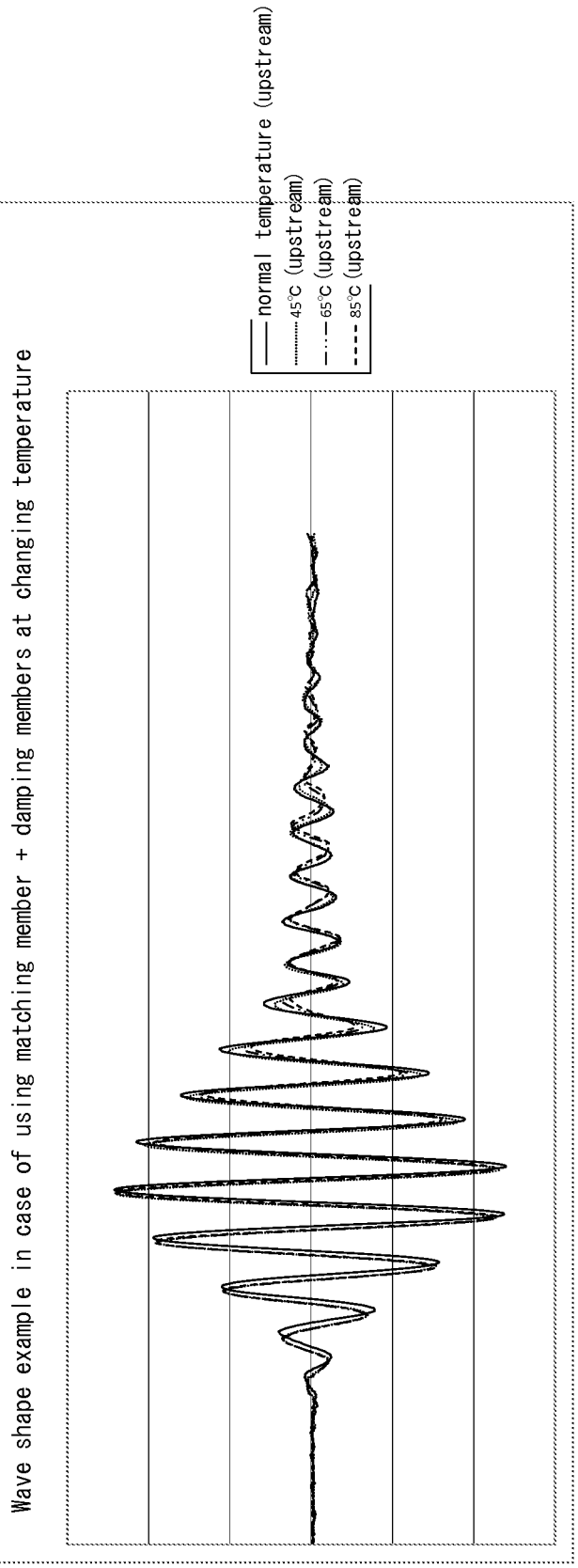

ULTRASONIC FLOWMETER HAVING AN ULTRASONIC TRANSDUCER WITH A RING SHAPED VIBRATOR AND A PAIR OF DAMPING MEMBERS

TECHNICAL FIELD

The present invention relates to an ultrasonic sensor used in a flowmeter for measuring a minute flow quantity with a high degree of accuracy, and to an ultrasonic flowmeter for measuring a minute flow rate by using the ultrasonic sensor.

BACKGROUND ART

JP 2000-121404 A discloses an unit for measuring a flow rate comprising a gas flow path; ultrasonic sensors for transmitting and receiving which are installed on the gas flow path; a controlling measurement circuit for controlling the transmitting and receiving of the ultrasonic sensors and measuring an ultrasonic propagation time, and further for transmitting and receiving measured data through data bus lines; and a non-volatile memory for memorizing a part of control contents in the controlling measurement circuit, wherein measurement of a true flow quantity is performed at every unit part of the constituents, calculation of the flow quantity is performed by performing transmitting and receiving data by means of a personal computer for processing data which is provided separately, specific amendment data of every unit part are written in the non-volatile memory from comparison to the true flow quantity to maintain the specific amendment data. As shown in JP 2000-121404 A, it is disclosed that the principle of the ultrasonic-style flow quantity detection, the propagation time of an ultrasonic wave between two points in the gas flow path, is a function including the gas flow velocity, such that the gas flow velocity can be calculated backward if the propagation time is measured, and the flow quantity can be calculated if the flow velocity and the passage sectional area are found and applied.

JP 2010-14690 A discloses an ultrasonic flowmeter that, in order to achieve flow measurement with a high degree of accuracy and superior in responsiveness, at a preliminary measurement for measuring a propagation time of an ultrasonic wave previously, the number of clock pulses measured from a time of ultrasonic wave transmitting to a time of ultrasonic wave receiving is memorized in a forward direction and in a reverse direction, and at the time of a main measurement after the preliminary measurement, counting the number of the clock pulse are starts from the time of ultrasonic wave transmitting, integration starts at a time of outputting clock pulses before two pulses of the number of clock pulses memorized in the forward direction and the reverse direction, and integral calculus voltage is measured at a time of reaching the received wave and a minute time is calculated, so that the propagation time is measured due to the clock pulse time and the minute time.

JP 2001-7539 A discloses an ultrasonic flowmeter that comprises a plurality of ultrasonic vibrators which is disposed on a measurement pipe with a specific distance along fluid flow and an operation circuit for calculating the velocity of a flowing fluid based on a time lag between a propagation time until the downstream ultrasonic vibrator receives the ultrasonic wave transmitted from the upstream ultrasonic vibrator and a propagation time until the upstream ultrasonic vibrator receives the ultrasonic wave transmitted from the downstream ultrasonic vibrator, wherein the ultrasonic vibrator transmits an ultrasonic wave with a first frequency and an ultrasonic wave with a second frequency determined previously corresponding to the measurement pipe alternately, and the operation circuit calculates a first time lag of the propagation time in the ultrasonic wave with the first frequency as a time lag when the flow velocity is zero, so that the flow velocity is calculated based on the first time lag and the second time lag of the propagation time in the ultrasonic wave with the second frequency.

Problem to be Solved by the Invention

In the above-mentioned ultrasonic flowmeter, particularly in the case of measuring the minute flow quantity, as disclosed in JP 2001-7539 A, it is difficult for the ultrasonic vibrator to be installed inside a conduit tube through which a minute quantity of fluid passes and there is a possibility that the flow itself is prevented, so that it is preferred that the ultrasonic vibrators are provided outside the conduit tube.

Besides, in the detection of the minute flow quantity, in the case that ultrasonic vibration which transmits from the upstream ultrasonic vibrator and propagates on the fluid flowing in a forward direction within the conduit tube is detected in the downstream ultrasonic vibrator and also ultrasonic vibration which transmits from the downstream ultrasonic vibrator and propagates on the fluid flowing in a reverse direction within the conduit tube is detected in the upstream ultrasonic vibrator, because the detected flow quantity is minute, in the case that there is variability in the condition of a joint part between the ultrasonic vibrator and the conduit tube, especially in a quantity of an adhesive agent adhering the ultrasonic vibrator to the conduit tube, and in a bonding condition such as an eccentricity thereof, since variability results in a vibration condition of the vibrator including attenuation of the vibrator, variability results in a propagation condition of the ultrasonic wave, and as a result they come into a phase difference, so that there is a problem of accidental error results in the detection of the minute flow quantity.

Moreover, the vibrator is grasped with one or more damping members so that the flow quantity detection does not become impossible without damping the vibration of the vibrator, because it is desired to steadily remove reverberation, the vibrator and the damping members being fixed by adhesive agent, but also due to variability of the adhesion condition of the adhesive agent between the vibrator and the damping members, transmitting and receiving of the ultrasonic wave is influenced, and as a result they come into a phase difference, so that there is a problem of accidental error results in the detection of the minute flow quantity.

In the first place, in the case of adhering polytetrafluoroethylene (PTFE) by an epoxy adhesive or the like, there was a problem such that productivity is low because the adhesion itself is very difficult. Even if the adhesion thereof is possible after the surface treatment thereof, the adhesive condition creates unpredictable variability and is far from good accuracy adhesion that could be achieved, so that there is a problem such that the phase difference is amplified especially by temperature or the like and zero-drift showing a flow quantity in the condition in which no flow occurs. They are similarly unpredictable and have differences among the sensors.

SUMMARY OF THE INVENTION

Means for Solving Problem

Therefore, the present invention is to provide an ultrasonic sensor preventing variability of an adhesive condition between the vibrator and the conduit tube and between the vibrator and the damping members in order to measure with a desired accuracy.

Accordingly, the present invention is an ultrasonic sensor comprising a ring-shaped ultrasonic vibrator that is disposed on an outer circumferential surface of a conduit tube in which a minute quantity of a substance flows and that is vibrated by application of high frequency signals and generates high frequency signals by receiving the vibration and a pair of damping members that is arranged so as to grasp and fix the ultrasonic vibrator, wherein an annular soft uniform matching member having a width along the conduit tube larger than that of the ultrasonic vibrator is provided between an inner circumferential surface of the ultrasonic vibrator and the outer circumferential surface of the conduit tube, and the matching member is made of a material having a sound propagation velocity substantially equal to a sound propagation velocity of the substance flowing in the conduit tube.

The description "having a sound propagation velocity substantially equal to a sound propagation velocity of the substance flowing in the conduit tube" has the same concept that a matching member having a density substantially equal to that of the measured fluid is selected. It is desired that the matching member is especially uniform.

Furthermore, it is desirable that contact surfaces between the ultrasonic vibrator and the damping members respectively are processed so that an adherence property thereof is minimized. For instance, the processing for minimizing the adherence property of the contact surfaces between the ultrasonic vibrator and the damping members, respectively is a surface coating processed on one or both of the surfaces or plasma surface treatment, preferably. Moreover, it is possible to grasp a non-adherent substance between the ultrasonic vibrator and damping members, respectively. Also, it is possible to provide intervening members such as a film on one surface or both surfaces of which is/are cured with a non-adherent treatment.

Moreover, it is desirable to apply grease with a density similar to that of the substance flowing in the conduit tube between the ultrasonic vibrator and the matching member and between the matching member and the conduit tube. For instance, in the case that the substance flowing in the conduit tube is water, it is desirable that the density of the grease is about 1.00.

Also, it is desirable that the damping member is a rubber-based substance with 20~25 of hardness.

In order to prevent aging degradation, especially in order to prevent moisture on surfaces between the vibrator and the damping member, it is preferred that a member for moisture prevention is provided.

Furthermore, another aspect of the present invention is to provide an ultrasonic flowmeter wherein ultrasonic sensors according to the present invention are arranged at a specific distance on the conduit tube in which the minute quantity of the substance flows.

Moreover, it is desirable that the ultrasonic flowmeter comprises a case constituted by a control unit housing part in which a control unit for measuring and outputting the flow quantity in the conduit tube is provided and a sensor protective part wherein the ultrasonic sensors are arranged at a specific distance, and furthermore, it is desirable that the sensor protective part of the case grasps and fixes the damping member in the condition in which the damping member is separated from the conduit tube.

The Effect of the Invention

According to an ultrasonic sensor according to the present invention and an ultrasonic flowmeter using it, an ultrasonic vibrator of the ultrasonic sensor is grasped by damping members and is fixed on a conduit tube and a ring-shaped uniform matching member with a material having a wave propagation velocity similar to that of a substance flowing in the conduit tube is interposed between the ultrasonic vibrator and the conduit tube, such that a vibration of the ultrasonic vibrator can be transmitted to fluid in the conduit tube steadily with low variability and vibration transmitting through the fluid can be detected evenly and steadily with low variability, so that the flow quantity, and the flow velocity of the fluid passing through the conduit tube can be detected with high accuracy.

Also, in the present invention, because the variability of phase differences is low, the zero drift can be decreased.

BRIEF DESCRIPTION OF THE DRAWINGS

FIG. 2 is a diagram showing the ultrasonic sensor according to the present invention;

FIG. 9 is shows wave examples at normal temperature, 45° C., 65° C. and 85° C. of the ultrasonic flowmeter wherein the vibrators, each of which is grasped by the damping members, are arranged via the matching member on the conduit tube.

MODE FOR CARRYING OUT THE INVENTION

Hereinafter, the embodiment of the present invention is described in view of the drawings.

Working Example

Figure 1:
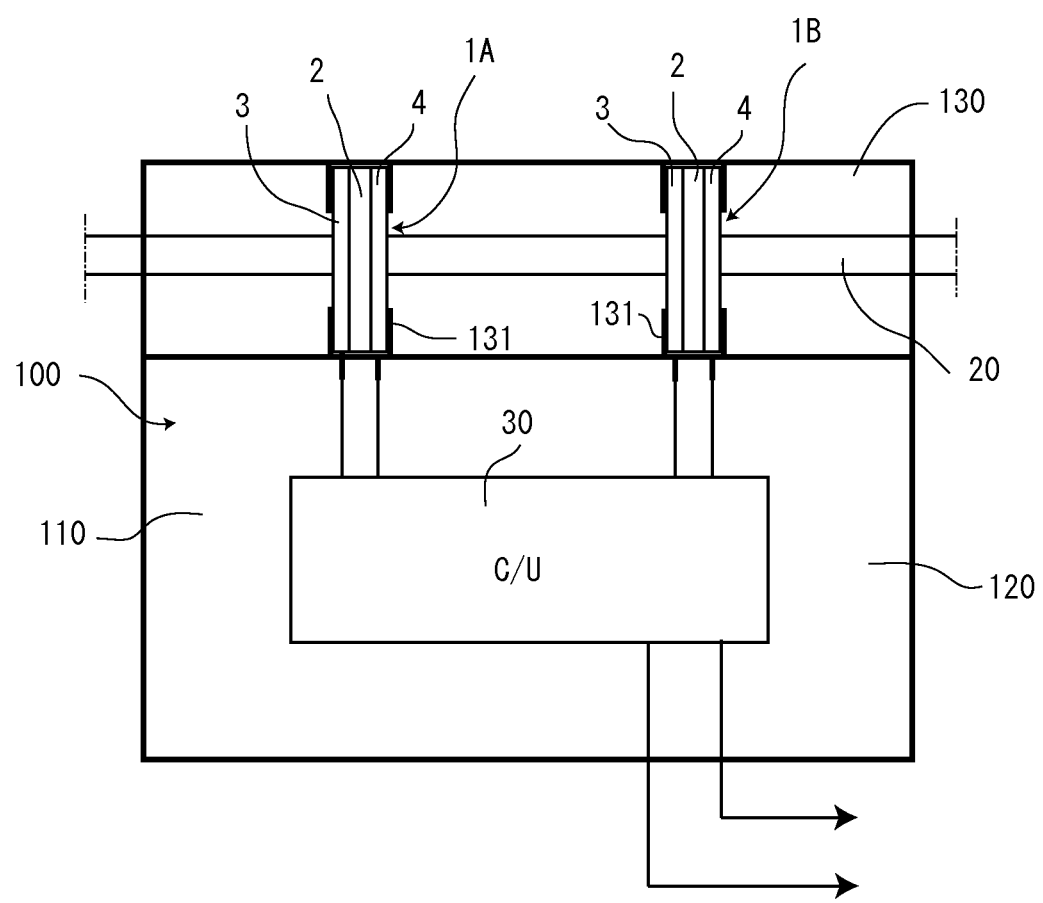
FIG. 1 is diagram showing an ultrasonic flowmeter according to the present invention wherein the ultrasonic sensors according to the present invention are arranged at a specific distance.

Ultrasonic sensors 1 (1A, 1B) according to the present invention are used in a minute quantity flowmeter 100, for example, shown in FIG. 1. For instance, in the minute quantity flowmeter 100 shown in FIG. 1, an upstream ultrasonic sensor 1A and a downstream ultrasonic sensor 1B are installed at a specific distance outside a conduit tube 20 through which a minute quantity of fluid flows. These ultrasonic sensors 1A, 1B are connected electrically with a control unit (C/U) 30. Thus, the control unit 30 supplies a high frequency wave to the upstream ultrasonic sensor 1A to be vibrated, the vibration propagated perpendicular to a flow direction of the fluid from the vibrator of the upstream ultrasonic sensor 1A changes direction at a center part of the conduit tube 20 to propagate along the flowing fluid and vibrates the vibrator of the downstream sensor 1B, and the control unit 30 detects electrically vibration of the vibrator in the downstream ultrasonic sensor 1B. Furthermore, the control unit 30 supplies high frequency wave to the downstream ultrasonic sensor 1B to be vibrated, the vibration propagated perpendicular to a flow direction of the fluid from the vibrator of the downstream ultrasonic sensor 1B changes direction at a center part of the conduit tube 20 to propagate along the flowing fluid and vibrates the vibrator of the upstream sensor 1A, and the control unit 30 detects electrically the vibration of the vibrator in the upstream ultrasonic sensor 1A. Hereby, in the control unit 30, a velocity of the fluid flowing in the conduit tube 20 is measured by the phase differences, respectively in order to calculate a flow quantity of the fluid from an average fluid velocity V and a cross sectional area S, and they are displayed or are changed to output signals.

Furthermore, the ultrasonic flowmeter 100 has a case 110 comprising a control unit housing part 120 in which the control unit 30 is installed and a sensor protection part 130 in which a pair of ultrasonic sensors 1A, 1B are installed. The sensor protection part 130 is formed integrally with the case 110 and has ultrasonic sensor holding parts 131 for grasping and fixing the ultrasonic sensors 1A, 1B, respectively. It is desirable that the ultrasonic sensor holding parts 131 hold the ultrasonic sensors 1A, 1B so as not to contact the conduit tube 20.

The ultrasonic sensor 1 used in the minute quantity flowmeter 100 is, for instance, as shown in FIG. 2, constituted of a ring-shaped ultrasonic vibrator 2 and a pair of damping members 3, 4 grasping the ultrasonic vibrator 2 to be fixed, and an annular soft uniform matching member 7 is provided between an inner surface of the ultrasonic vibrator 2 and an outer surface of the conduit tube 20.

In the case of providing a material for damp proofing on an outer circumferential surface of the vibrator for moisture prevention of the surfaces 8 between the damping members 3, 4 and the ultrasonic vibrator 2, it is desirable that the outer circumferential surface does not prevent free-vibration of the vibrator in adhesive agents, viscosity or the like, similarly to the surfaces 8 between the damping members 3, 4 and the ultrasonic vibrator 2.

Usually, the conduit tube 20 is formed by PTFE with a diameter of 3 mm, 4 mm or 6 mm; in the case that the measured fluid is water, it is desirable that the matching member 7 is made of a soft vinyl-based material such as polyethylene (PE) having a sound velocity similar to the velocity propagating in water. Furthermore, it is desirable that grease (for instance, the density of grease is close to 1.0) with a sound velocity similar to the sound velocity at which the measured fluid (for instance, water) is propagated is applied to a surface 9 between the ultrasonic vibrator 2 and the matching member 7 and a surface 10 between the matching member 7 and the conduit tube 20.

Hereby, a condition of interface between the ultrasonic vibrator 2 and the conduit tube 20 is that, for instance, in the case of an epoxide-based adhesive, an acoustic impedance ($z=\rho c$) that multiples density ($\rho$) by sound velocity (c) in the substance is almost the same in PTFE and the epoxide-based adhesive and the sound velocity (c) in each substance is almost 1300 m/sec and almost 2500 m/sec, such that the vibration propagated through the fluid is transmitted through the bonding part with a non-predictable variability with a width thereof being larger than that of PTFE and the vibrator from the fluid to the ultrasonic vibrator at twice velocity at a dash, but in the case of the uniform matching member 7 with a width larger than that of the ultrasonic vibrator 2, due to matching the density ($\rho$), the sound velocity (c) in the substance or the like to the water similarly, the vibration is not transmitted at twice velocity at a dash through the almost uniform matching member 7 and a quality of a material thereof which is made almost evenly by nature is selected, so that the variability is not a cause for concern and transmitting and receiving can be achieved uniformly with low variability.

Also, due to the soft uniform matching member 7, since the ultrasonic vibrator 2 can be vibrated smoothly in a direction against the conduit tube 20, the vibration is transmitted evenly and with low variability to the fluid flowing in the conduit tube 20.

Figure 4:
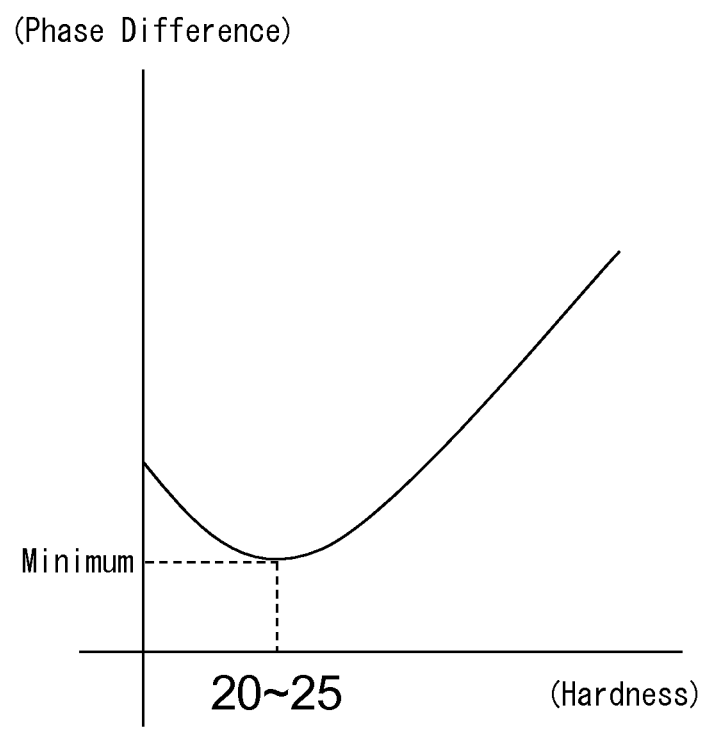
FIG. 4 is a graph diagram showing the relationship between hardness of the damping member and the phase difference.

Furthermore, as shown in FIG. 4, it is desirable that the damping members 3, 4 are formed of a rubber-based material with hardness from 20 to 25 so that sound reverberation of the ultrasonic vibrator 2 is removed evenly and with low variability.

Moreover, it is desirable that the surfaces 8 between the damping members 3, 4 and the ultrasonic vibrator 2, respectively are processed so as not to produce adhesiveness. There is a method of surface coating, a method for treating a surface by performing a plasma treatment so as not to produce an adhesive on the surface, a method for interposing a film as an intervening member, one or both of whose surfaces is/are treated so as not to produce adhesiveness, and a method for interposing a film consisting of a non-adhesive material or the like in the processing.

Hereby, to the conduit tube 20 and to the flow direction of the fluid, by the damping members 3, 4 and the soft uniform matching member 7, namely it is possible not to make a fixed end vibration by using the adhesive agent but it is possible to vibrate smoothly by free-vibration without fixing, and further vibration in the flow direction is damped by the damping members 3, 4 and the sound reverberation of the ultrasonic vibrator 2 can be removed evenly with low variability, and also to the flow direction against the conduit tube 20, by the damping members 3, 4 and the soft uniform matching member 7, namely it is possible not to make a fixed end vibration by using the adhesive agent but it is possible to vibrate smoothly by free-vibration without fixing, and further vibration in the flow direction against the conduit tube is damped by the damping members 3, 4 and the sound reverberation of the ultrasonic vibrator 2 can be removed evenly with low variability.

Due to the above-mentioned constitution, according to the present invention, because the vibration of the ultrasonic vibrator can be transmitted steadily with low variability to the fluid in the conduit tube and the vibration propagated through the fluid in the conduit tube can be detected by the ultrasonic vibrator evenly with low variability, the effect that the flow quantity and the flow velocity of the fluid passing through the conduit tube can be detected with good accuracy can be achieved.

Figure 3A:
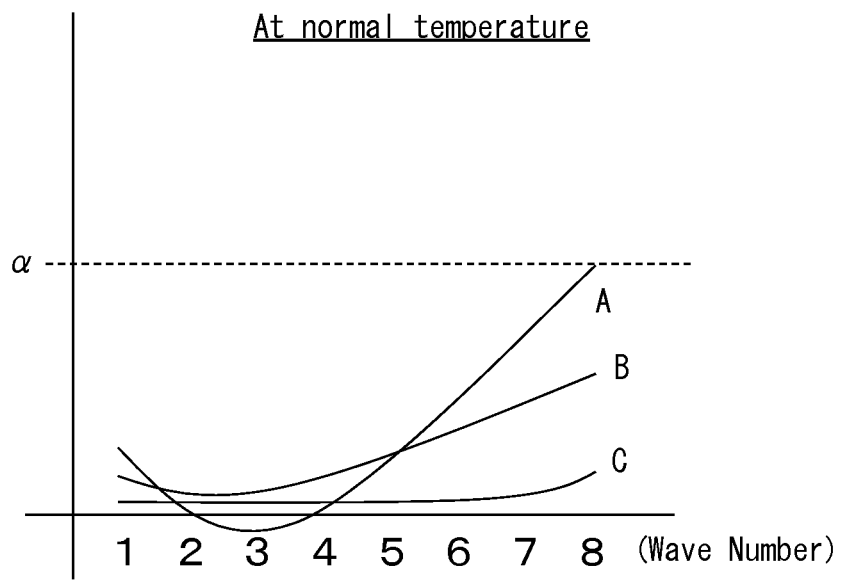
FIG. 3A is a graph diagram with property (A) showing a phase difference against the wave number of the ultrasonic flowmeter wherein the vibrators, each of which is grasped by the damping members, are bonded on the conduit tube, property (B) showing a phase difference against the wave number of the ultrasonic flowmeter wherein the vibrators are arranged via the matching member on the conduit tube, and property (C) showing a phase difference against the wave number of the ultrasonic flowmeter wherein the vibrators, each of which is grasped by the damping members, are arranged via the matching member on the conduit tube, at normal temperature.
Figure 3B:
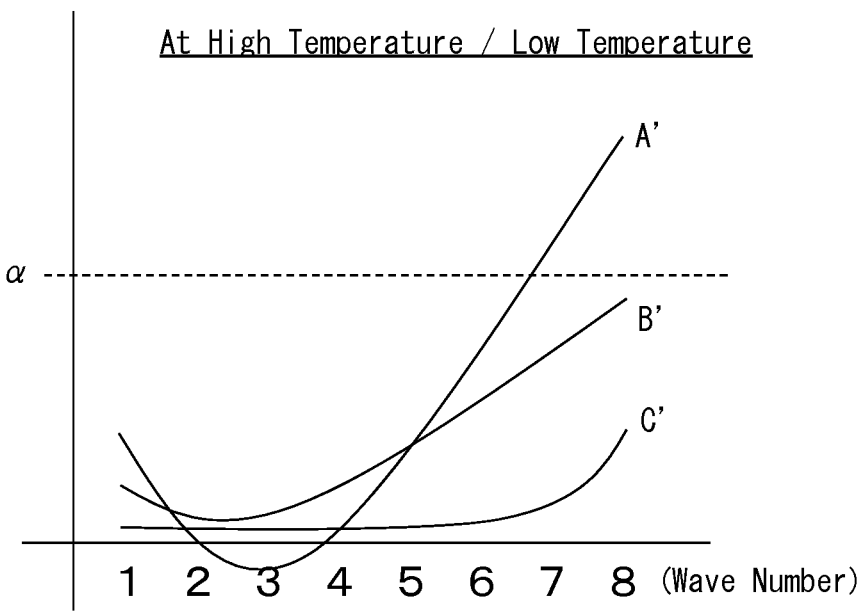
FIG. 3B is a graph diagram with property (A) showing a phase difference against the wave number of the ultrasonic flowmeter wherein the vibrators, each of which is grasped by the damping members, are bonded on the conduit tube, property (B) showing a phase difference against the wave number of the ultrasonic flowmeter wherein the vibrators are arranged via the matching member on the conduit tube, and property (C) showing a phase difference against the wave number of the ultrasonic flowmeter wherein the vibrators, each of which is grasped by the damping members, are arranged via the matching member on the conduit tube, at high temperature or at low temperature.

Also, the ultrasonic flowmeter 100 in which the ultrasonic sensors 1 according to the above-mentioned constitution are installed, as shown in FIG. 3A, 3B, can achieve the effect that zero drift can be decreased because the variability of the phase difference is low. Furthermore, because the variability, such as an eccentricity between PTFE and the ring-shaped ultrasonic vibrator or the like, can be decreased, it is possible to produce with good accuracy, a poor quality of reproducibility between the sensors can be decreased, and the constitution thereof is simple, and the effects of high cost performance, high productivity, and largely simple production can be achieved.

As the ultrasonic sensor 1 is protected by the case 110 from shock and moisture, even when the ultrasonic sensors 1A, 1B are installed in the sensor protective part 130, the effect that the flow quantity and the flow velocity of the fluid passing through the conduit tube 20 can be detected with good accuracy, and the effect that the zero drift can be decreased or the like must be achieved, so the sensor protective part 130 is provided in a case 110 made of plastics, metal or the like. In this case, it is desirable that the damping members 3, 4 are grasped by the ultrasonic holding parts 131 respectively, and are supported in the condition in which the damping members 3, 4 are separated from the conduit tube 20 so as not to be adhered to by the adhesive agent to the conduit tube 20. In the case, regarding the other parts supporting the ultrasonic sensor 1, they are not restricted especially. Furthermore, for the sensor protective part 130 and the control unit housing part 120, it is not restricted whether they are integrated or separated.

Figure 5:
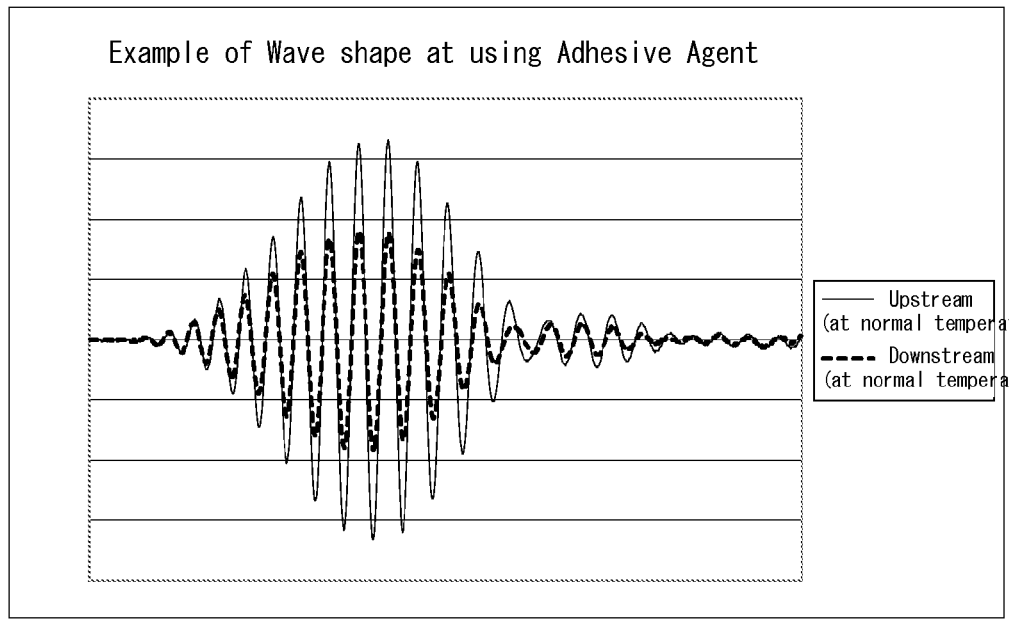
FIG. 5 shows an example of general waves displayed on an oscilloscope using an adhesive agent at normal temperature.

FIG. 5 shows an example of general waves displayed on the oscilloscope in the case that the ultrasonic vibrator 2 and the damping members 3, 4 are fixed by using the adhesive agent and are vibrated, and shows that an amplitude difference between the upstream side and the downstream side is remarkably different according to the variability of the adhesive condition thereof.

Figure 6:
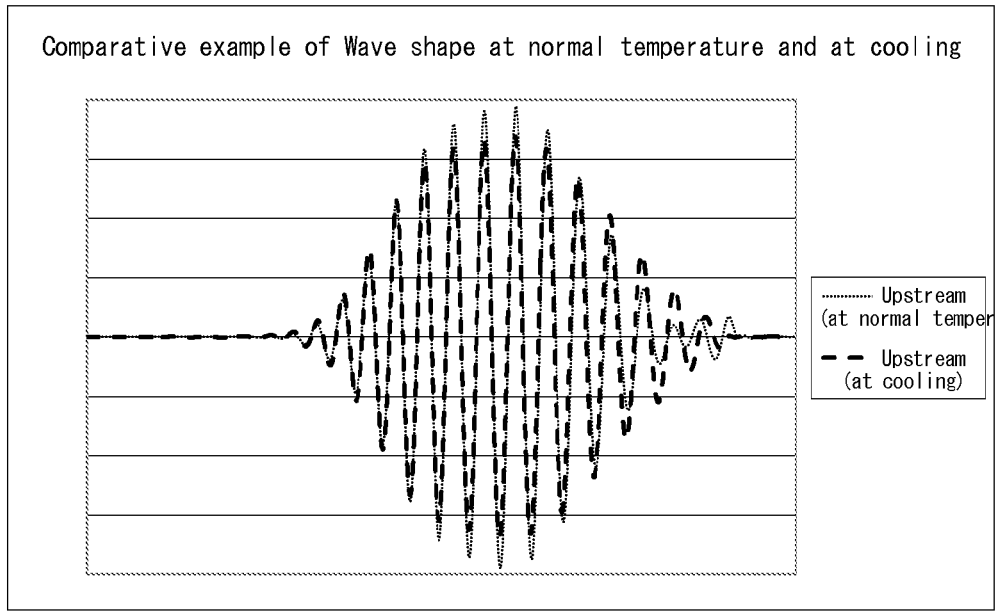
FIG. 6 shows comparison examples of general waves displayed on an oscilloscope at normal temperature or at cooling.

FIG. 6 shows a comparative example of general waves displayed on the oscilloscope, wherein an amplitude difference due to a temperature difference can be found in a wave center region and a wave posterior region. Thus, because the difference appears in the wave shape due to the variability of the adhesive condition and the temperature difference, the difference influences the phase difference.

Figure 7:
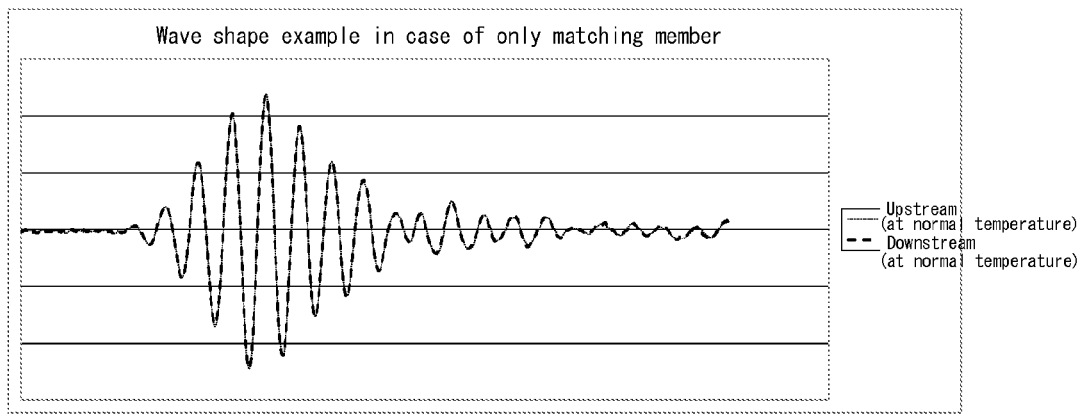
FIG. 7 shows wave examples at normal temperature of the ultrasonic flowmeter wherein the vibrators are arranged via the matching member on the conduit tube.

FIG. 7 shows wave examples in the upstream side and the downstream side in the ultrasonic flowmeter 100 wherein the vibrator 2 is arranged via the matching member 7 on the conduit tube 20 and vibrated at normal temperature.

Figure 8:
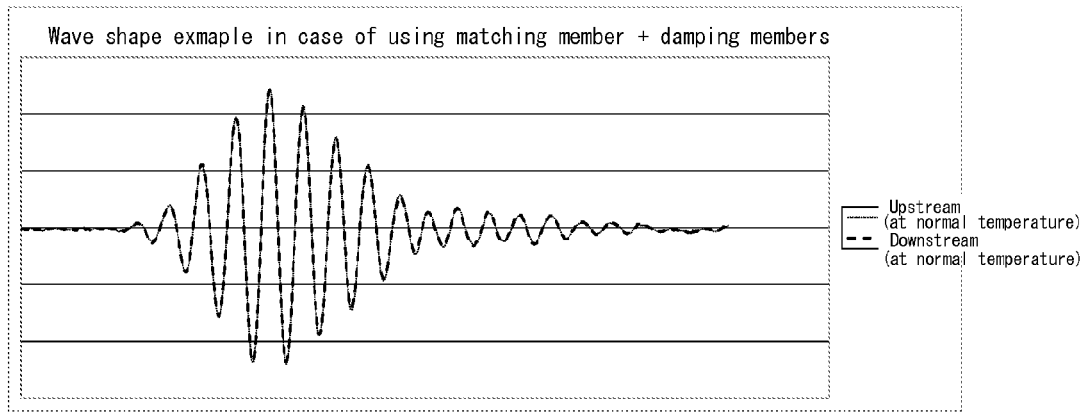
FIG. 8 shows wave examples at normal temperature of the ultrasonic flowmeter wherein the vibrators, each of which is grasped by the damping members, are arranged via the matching member on the conduit tube.

FIG. 8 shows wave examples in the upstream side and the downstream side in the ultrasonic flowmeter 100 wherein the vibrator 2 grasped by the damping members 3, 4 is arranged via the matching member 7 on the conduit tube 20 and vibrated at normal temperature.

FIG. 9 shows wave examples in the upstream side in the ultrasonic flowmeter 100 wherein the vibrator 2 grasped by the damping members 3, 4 is arranged via the matching member 7 on the conduit tube 20 and vibrated at normal temperature, 45° C., 65° C. and 85° C. The wave shapes used substantially in the flow quantity measurement have little difference in the upstream side and the downstream side, as shown in FIGS. 7 and 8.

Also, in FIGS. 3A and 3B, A, A' indicate characteristics of the ultrasonic flowmeter in the case that the ultrasonic vibrator 2 is grasped and fixed by the damping member 3, 4 with an adhesive agent and is adhered to and fixed on the conduit tube 20. The wave shape differences in the upstream side and the downstream side in the ultrasonic flowmeter are low, but according to the wave shape difference due to variability of the adhesive condition as shown in FIG. 5, in addition to the wave shape difference due to temperature as shown in FIG. 6, the phase difference becomes worse.

B, B' indicate characteristics of the ultrasonic flowmeter in the case of fixing the ultrasonic vibrator 2 via the matching member 7 on the conduit tube 20, the wave shape difference as shown in FIGS. 5 and 6 appears in a quantity that proceeds to the case that the vibrator 2 is not grasped by the damping members 3, 4, but the quantity is not as much as the case of fixture by the adhesive agent and the variability is low, so that B, B' do not become of poor quality like the case of A, A'.

C, C' indicate characteristics of the ultrasonic flowmeter in the case of grasping and fixing the ultrasonic vibrator 2 by the damping members 3, 4 and fixing it via the matching member 7 on the conduit tube 20. Due to the constitution comprising the damping members 3, 4 and the matching member 7, wave shape differences in the upstream side and the downstream side thereof become remarkably little, so that the phase difference is decreased. Thus, it can be read from the above characteristics that the characteristics indicated by C, C' in the ultrasonic flowmeter according to the present invention indicate that the phase differences are much less.

INDEX OF REFERENCE CHARACTERS 1, 1A, 1B Ultrasonic sensor
2 Ultrasonic flowmeter
3, 4 Damping member
7 Matching member
8 Surface between the vibrator and the damping members
9 Surface between the vibrator and the matching member
10 Surface between the matching member and the conduit tube
20 Conduit tube
30 Control unit
100 Ultrasonic flowmeter
120 Control unit housing part
130 Ultrasonic sensor protective part
131 Ultrasonic sensor holding part

The invention claimed is:
1. The ultrasonic sensor comprising:
a ring-shaped ultrasonic vibrator disposed on an outer circumferential surface of a conduit tube in which a minute quantity of a substance is configured to flow, said substance being vibrated by application of high frequency signals and high frequency signals being generated by receiving the vibration transmitted from said substance;
a pair of damping members arranged on respective left and right sides of said ultrasonic vibrator in order to grasp and fix said ultrasonic vibrator to said conduit pipe; and
an annular soft uniform matching member having a width along said conduit tube that is larger than a width of said ultrasonic vibrator in a longitudinal direction of said conduit tube, said matching member being provided between said ultrasonic vibrator and said conduit tube, and being made of a material having a sound propagation velocity substantially equal to a sound propagation velocity of said substance.

2. The ultrasonic sensor according to claim 1,
further comprising a first vertical contact surface between said ultrasonic vibrator and a first one of said pair of damping members, and a second vertical contact surface between said ultrasonic vibrator and a second one of said pair of damping members,
wherein said first vertical contact surface and said second vertical contact surface are each processed so as to minimize an adherence property thereof.

3. The ultrasonic sensor according to claim 2, further comprising:
a non-adherent substance interposed between said ultrasonic vibrator and each of said pair of damping members.

4. The ultrasonic sensor according to claim 3, further comprising:
a sheet cured with a non-adherent treatment provided between said ultrasonic vibrator and each of said pair of damping members.

5. The ultrasonic sensor according to claim 4, further comprising:
grease applied between said ultrasonic vibrator and said matching member and between said matching member and said conduit tube, said grease having a density almost similar to that of said substance.

6. An ultrasonic flowmeter having two ultrasonic sensors according to claim 5 which are arranged at a specific distance on said conduit tube.

7. The ultrasonic flowmeter according to claim 6, further comprising:
a case which is constituted by a control unit housing part for housing a control unit for measuring and outputting a flow quantity of said substance; and
a sensor protective part in which said two ultrasonic sensors are arranged at the specific distance in order to grasp and fix said pair of damping members in a condition in which said pair of damping members is separated from said conduit tube.

8. The ultrasonic sensor according to claim 2, further comprising:
a sheet cured with a non-adherent treatment provided between said ultrasonic vibrator and each of said pair of damping members.

9. The ultrasonic sensor according to claim 2, further comprising:
grease applied between said ultrasonic vibrator and said matching member and between said matching member and said conduit tube, said grease having a density almost similar to that of said substance.

10. An ultrasonic flowmeter having two ultrasonic sensors according to claim 2 which are arranged at a specific distance on said conduit tube.

11. The ultrasonic sensor according to claim 1,
further comprising a first vertical contact surface between said ultrasonic vibrator and a first one of said pair of damping members, and a second vertical contact surface between said ultrasonic vibrator and a second one of said pair of damping members,
wherein said first vertical contact surface and said second vertical contact surface are each processed with a surface coating so as to minimize an adherence property thereof.

12. The ultrasonic sensor according to claim 1,
further comprising a first vertical contact surface between said ultrasonic vibrator and a first one of said pair of damping members, and a second vertical contact surface between said ultrasonic vibrator and a second one of said pair of damping members,
wherein said first vertical contact surface and said second vertical contact surface are each processed with a plasma surface treatment so as to minimize an adherence property thereof.

13. The ultrasonic sensor according to claim 1, further comprising:
a non-adherent substance interposed between said ultrasonic vibrator and each of said pair of damping members.

14. The ultrasonic sensor according to claim 13, further comprising:
a sheet cured with a non-adherent treatment provided between said ultrasonic vibrator and each of said pair of damping members.

15. The ultrasonic sensor according to claim 14, further comprising:
grease applied between said ultrasonic vibrator and said matching member and between said matching member and said conduit tube, said grease having a density almost similar to that of said substance.

16. An ultrasonic flowmeter having two ultrasonic sensors according to claim 15 which are arranged at a specific distance on said conduit tube.

17. The ultrasonic sensor according to claim 1, further comprising:
a sheet cured with a non-adherent treatment provided between said ultrasonic vibrator and each of said pair of damping members.

18. The ultrasonic sensor according to claim 1, further comprising:
grease applied between said ultrasonic vibrator and said matching member and between said matching member and said conduit tube, said grease having a density almost similar to that of said substance.

19. An ultrasonic flowmeter having two ultrasonic sensors according to claim 1 which are arranged at a specific distance on said conduit tube.

20. The ultrasonic flowmeter according to claim 19, further comprising:
a case which is constituted by a control unit housing part for housing a control unit for measuring and outputting a flow quantity of said substance; and
a sensor protective part in which said two ultrasonic sensors are arranged at the specific distance in order to grasp and fix said pair of damping members in a condition in which said pair of damping members is separated from said conduit tube.

* * * * *